Dec. 3, 1957

J. D. SPRIGGS 2,815,253

BEARING LINER

Filed Jan. 15, 1954

INVENTOR
John D. Spriggs
BY
Darby & Darby
ATTORNEYS

United States Patent Office 2,815,253
Patented Dec. 3, 1957

2,815,253

BEARING LINER

John D. Spriggs, Floral Park, N. Y., assignor, by direct and mesne assignments, to Nylacore Corporation, Glen Cove, N. Y., a corporation of Delaware Application January 15, 1954, Serial No. 404,195

6 Claims. (Cl. 308—238)

This invention relates to cast resin bearing liners, and in particular to extremely thin bearing liners formed of synthetic resins which are characterized by being self-lubricating in their physical properties.

For many applications, the utility of plastic or resinous materials for bearings is exceptional, in that it permits their utilization in service which requires no liquid lubricant and, for this reason, such specialized applications as are found in the textile industry, where contamination of the fibers by extraneous lubricants is undesirable, open a wide field of application therefor.

In this type of application, it is generally desirable and advantageous to keep the thickness of the bearing facing material to a minimum, principally because resinous materials, as such, are rather poor load carriers when they become heated in that they tend to flow, pack or otherwise develop some asymmetry which impairs their utility.

It is accordingly a fundamental object of the instant invention to provide a form of bearing liner which will be thin enough to pass generated heat readily and also which will not develop serious difficulties as a result of flow in the bearing.

It is a further object of the invention to provide a form of bearing liner which may be cast readily to the desired degree of thinness.

It is still another object of the invention to provide a form of bearing liner which will provide small spaces for the flow of lubricants therethrough, should a lubricant be used.

Other objects and advantages of the invention will in part be obvious and in part appear hereinafter.

The invention accordingly is embodied in a bearing having a thin resin liner which is cast into the bearing housing itself, and in the method of casting the liner, which product has the combination of properties and features of construction to be described in greater detail hereinafter, the method being characterized by the steps and combination of steps and their relation to each other as hereinafter set forth.

In the drawings illustrating the instant invention,

Figure 1 constitutes an end elevation of a typical bearing formed in accordance with my invention;

Figure 1:
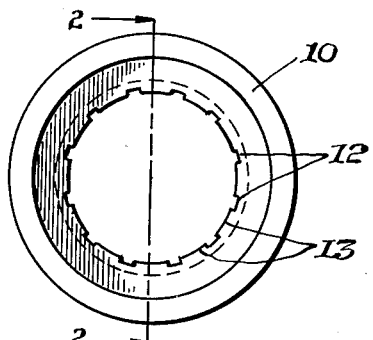

Referring back to Figures 1 and 2, 10 represents a bearing which may be made of any of the conventional bearing metals, the structure being characterized by having formed on the interior face thereof a series of circumferential grooves 11, and a plurality of longitudinal grooves 12. On the interior face of the bearing there is thus formed a network or pattern of lands 13 which are rectangular in their projected form.

Figure 2:
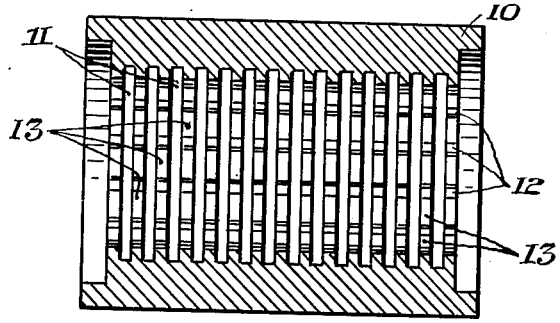
Figure 2 is a longitudinal section of the bearing shown in Figure 1.

For illustrative purposes, the proportions of parts in Figure 2 are exaggerated, and it should be noted that the area of the lands 13 between the grooves may be extended to about 0.5 inch and the grooves themselves may have the width of about $50/1000$ inch. The thickness of the bearing liner on the lands is preferably kept under about 0.005 inch.

Similarly, it should be noted that the several grooves need not be of uniform depth, but that a relatively deep groove can be placed at intervals among the ones in the pattern to assist in feeding resin through the casting.

The grooves serve the function also of locking the liner in place against circumferential or longitudinal displacement.

Figure 3:
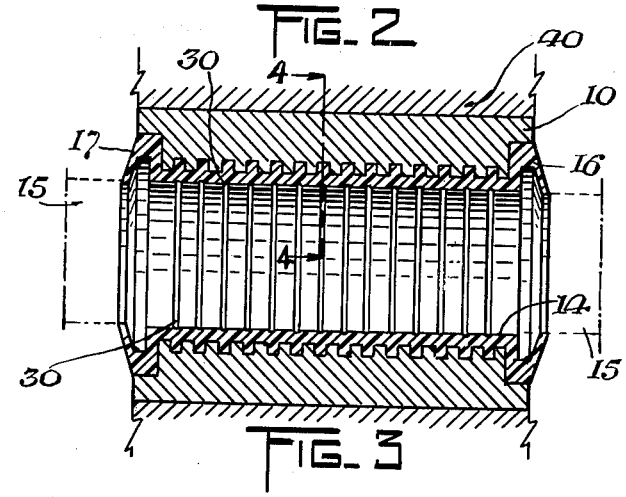
Figure 3 is a longitudinal section through a bearing such as that shown in Figures 1 and 2, the bearing having a cast resin liner formed therein.
Figure 4:
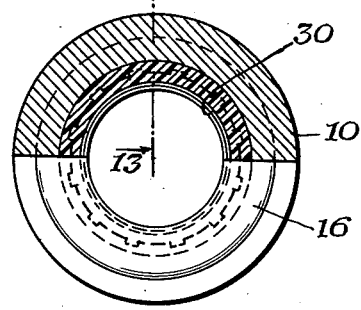
Figure 4 is a section taken along the line 4—4 of Figure 3, showing the relation of the bearing liner to the bearing itself.

The method of forming the bearing liner may be readily understood by reference to Figs. 3-4, where the bearing 10 is shown mounted in some form of support 40. To form the bearing liner 14, arbor 15, shown in dotted lines, having an outside diameter corresponding to the inside diameter of the bearing liner is aligned with the bearing housing itself, and locked in place in any secure manner. It should be noted that for casting a bearing liner having the thickness of 0.005 inch, the arbor would have a total diameter of about 0.010 inch less than the inside diameter of the bearing housing itself.

Having set the arbor in place, molten resin, for example nylon which melts at a temperature in the range from about 350 to 370° F., is forced into the space between the arbor and the bearing itself, under pressure. The material is forced in from one end until it appears at the other, at which time it can be assumed that the pattern of grooves is well filled. To facilitate the flow of resin into the bearing liner, the bearing housing 10 can be pre-heated to a temperature within the melting range of the resin used. Generally, it is sufficient to pre-heat the bearing housing itself to a temperature within 100° to 200° F. of the casting temperature of the resin to be used.

Figure 5:
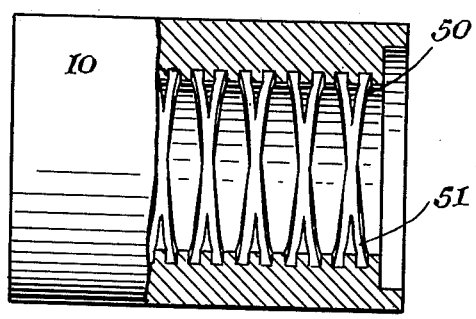
Figure 5 is a partial, longitudinal section of a bearing showing a modified interior structure following the principles of my invention.
Figure 6:
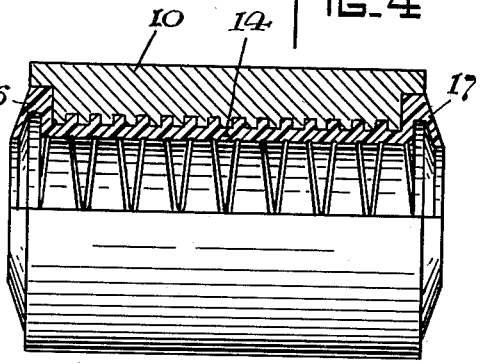
Figure 6 is a partial, longitudinal section through a bearing having a liner cast therein in accordance with my invention.

In Figures 5 and 6 there is shown an alternative version of the bearing with an alternative groove pattern for encouraging the flow of resin thereinto. In this instance, the bearing 10 carries essentially two sets of grooves 50 and 51, which may be described as left and right-hand helixes formed on the interior face thereof. In casting the desired resin bearing liner therein, essentially the same technique is followed in that an arbor of the appropriate diameter is aligned in the bearing and the resin forced thereinto.

Figure 7:
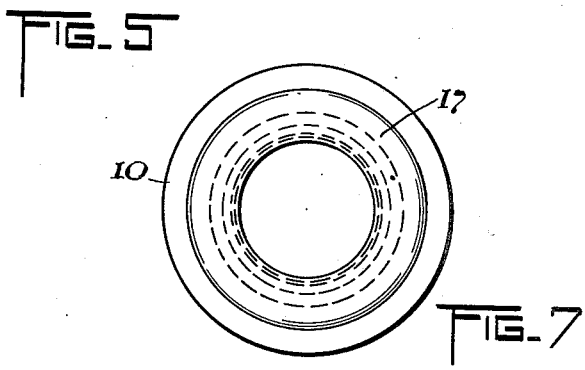
Figure 7 is an end elevation of the lined bearing of Figure 6.

Figure 7 is an end elevation of the bearing and liner shown in Figure 6.

For forming an appropriate end or cap 16 for the bearing liner as shown in Figure 3, and Figure 6, the arbor may be provided with a cap corresponding to the interior outline thereof, or the arbor may be a uniform rod and a block of resin may be cast around the circumference of the outer end of the bearing liner and the lip illustrated at 16 and 17 in Figure 3 may be machined into the bearing. Similar considerations apply to the finishing of the ends of the bearing shown in Figure 6.

When the instant method of casting thin bearing liners is employed, the mass of bearing material between the arbor and bearing head itself is so small that upon solidification of the plastic, a small amount of shrinkage will take place and will be emphasized in the areas between the lands of the bearing itself. Thus the resin bearing liner in its finished form has small grooves, indicated as 30 in Figure 3, in its surface corresponding in placement to the grooves within the bearing liner itself. These small grooves serve the useful purpose in use, for when the bearing becomes heated, expansion room is automatically provided, and also if a liquid lubricant of any type is used, the small grooves therefor are defined within the bearing itself.

Suitable bearing liner materials to be used in accordance with this invention are the relatively high melting synthetic resins which are characterized by being self-lubricating, or by having lubricant, solid or liquid, incorporated therein.

For example, a typical synthetic polyamide, nylon, which has been mentioned in the specific examples, is exceptionally useful for making thin bearing liners in accordance with the instant application for it has the property of being self-lubricating to a considerable extent and accordingly makes useful liners for special applications.

Similarly, polyethylene resins, particularly those of high molecular weight, which have high melting points, are useful for making bearing liners. The highly fluorinated hydrocarbons also serve as useful resins for casting liners in accordance with the instant invention. The basic property desired is that of being essentially self-lubricating and of having a high melting point so that the heat usually generated in the bearing will not be sufficient to melt the resin.

Plastic liners are commonly looked upon as self-lubricating materials which need no extraneous lubricant. However, there are used therewith such lubricants as aqueous suspensions of carbon, finely ground mica and similar solid lubricants. If desired, certain solid lubricants such as molybdenum disulfide in finely divided form may be incorporated into the molten resin and thereby cast into place with it to form a unitary bearing liner supplying its own lubrication.

The solid resins preferred for use in forming bearing liners in accordance with the instant invention are nylons, polyethylenes and highly fluorinated compounds such as polytetrafluoroethylene. In general the resins usable for bearing liners will be those having a high molecular weight which leaves them solid and firm at conventional bearing operating temperatures. For example, in selecting a particular resin for a bearing, if it is known that the bearing will run at a temperature of about 150° to 200° F., it will be advisable to select a resin having a softening point substantially above 200° F., e. g., about 250° F. These design considerations follow from the known characteristics of the resin to be used and the load to be placed upon the bearing liner.

Where a solid lubricant is to be incorporated into the material it is ground to an extremely fine state of subdivision, preferably about 600 mesh, and incorporated into a melt of the resin. The proportions of the solid materials to be used may be varied within relatively wide limits, but it has been found that amounts from about 10 to 50 percent by weight of the resin composition itself are adequate. Thus, in making a nylon bearing liner incorporating molybdenum disulfide as a solid lubricant 5 parts of a resin powder having a melting point of about 350° F. is blended with 1 part by weight of molybdenum disulfide, finely divided so as to pass a 600 mesh screen. Upon the development of a smooth paste, casting in accordance with the instant invention may be carried out. Similar considerations apply to the employment of the other types of resins mentioned and the incorporation thereinto of other solid lubricants.

In use, therefore, a typical bearing liner in accordance with the instant invention would be like one shown in Figure 3, where 40 would represent the machine in which the bearing is mounted and 10 the bearing through which a shaft is to run. In this instant the arbor 15 adequately illustrates the manner in which a shaft would be placed in a bearing. The dimensional exaggeration in the drawing was employed to facilitate visualizing the form of bearing liner to be cast. The actual wearing surface of the bearing constituting those parts of the plastic which overlie the lands in the bearing would preferably be of a thickness of a few thousandths of an inch, preferably 0.005 inch to 0.001 or less. The shrinkage grooves which can be induced in the bearing liner overlying the grooves of the bearing itself serve as conduits for such lubrication as the designer may wish to inject into the bearing.

Though the invention has been described with only a few simple embodiments, it is to be understood that variations thereof may be made without departing from the spirit or scope thereof.

What is claimed is:

1. A bearing comprising a metal body having a passage to receive a shaft to be journaled therein, the defining walls of said passage having a plurality of blind grooves opening into the passage to form a plurality of lands therebetween, and a liner of plastic material moulded in situ to fill said grooves and overlie said lands, said plastic material being a high melting, self-lubricating synthetic resin and having a thickness at said lands less than 0.005 inch.

2. In the combination of claim 1, said grooves comprising a network of circumferential and longitudinal channels.

3. In the combination of claim 1, said resin being nylon.

4. In the combination of claim 1, said resin being polyethylene.

5. In the combination of claim 1, said resin being a fluorinated hydrocarbon.

6. In the combination of claim 1, said body having an annular recess in at least one end concentric with said passage, and said liner having an axial extension lying in said recess and a shaft opening concentric with said passage and of slightly smaller diameter than that of the liner, thereby to form a dust protector.

References Cited in the file of this patent
UNITED STATES PATENTS

| | | |
|---|---|---|
| 1,494,099 | Cole | May 13, 1924 |
| 1,512,190 | Barnes | Oct. 21, 1924 |
| 1,923,514 | Stockfleth | Aug. 22, 1933 |
| 1,959,254 | Zerk | May 15, 1934 |
| 2,067,034 | Whiteley | Jan. 5, 1937 |
| 2,246,092 | Gilman | June 17, 1941 |
| 2,276,143 | Bell | Mar. 10, 1942 |
| 2,400,091 | Alfthan | May 14, 1946 |
| 2,459,598 | Stott | Jan. 18, 1949 |
| 2,639,198 | Kirkham | May 19, 1953 |